UNITED STATES PATENT OFFICE.

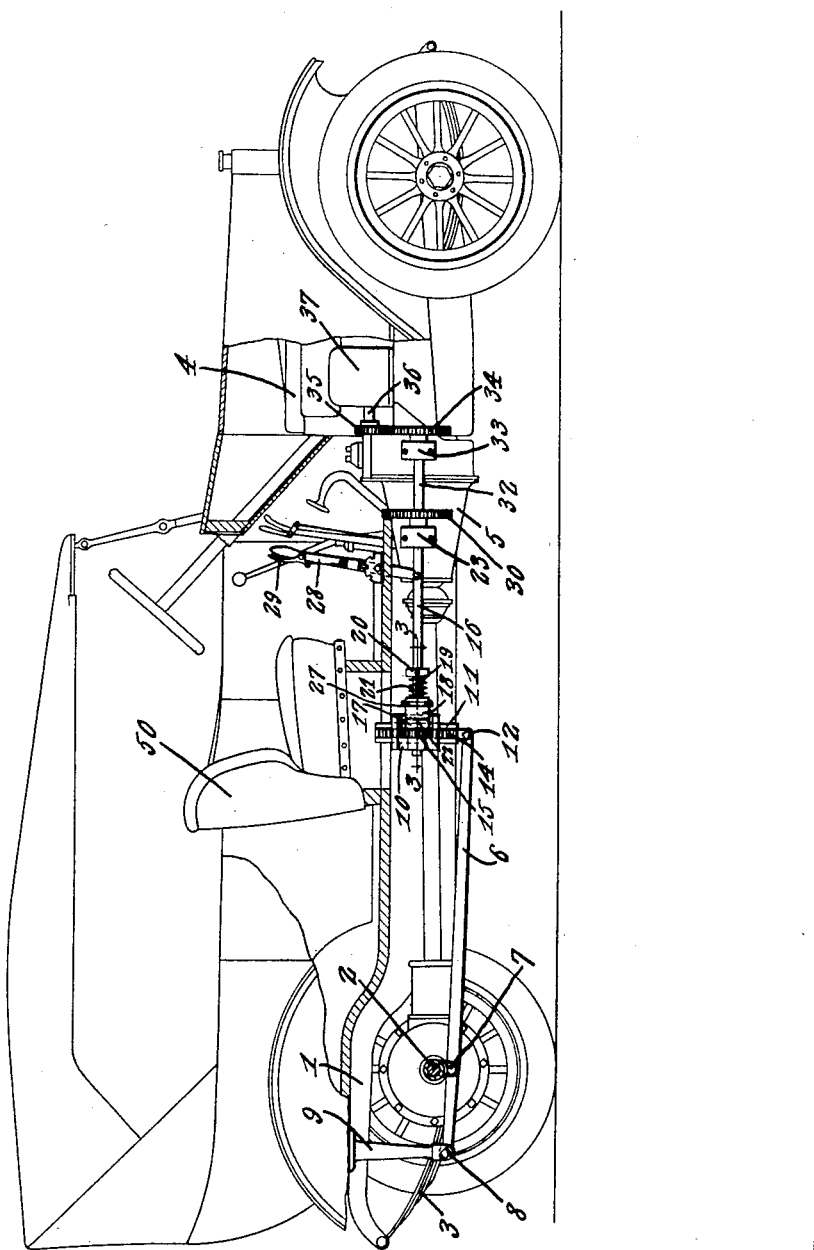

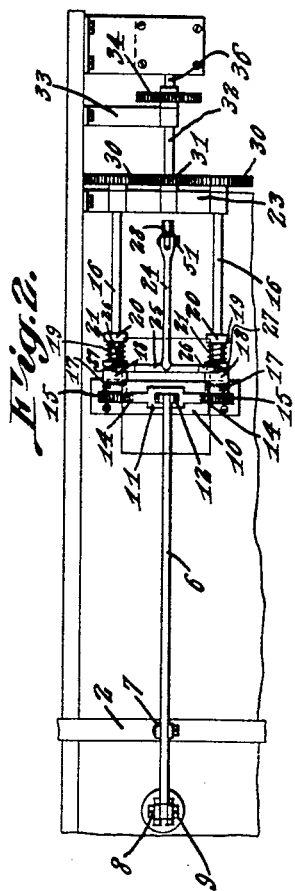
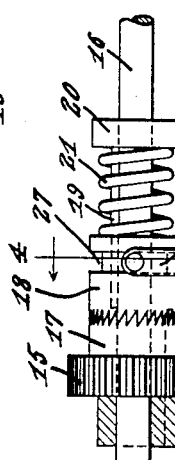
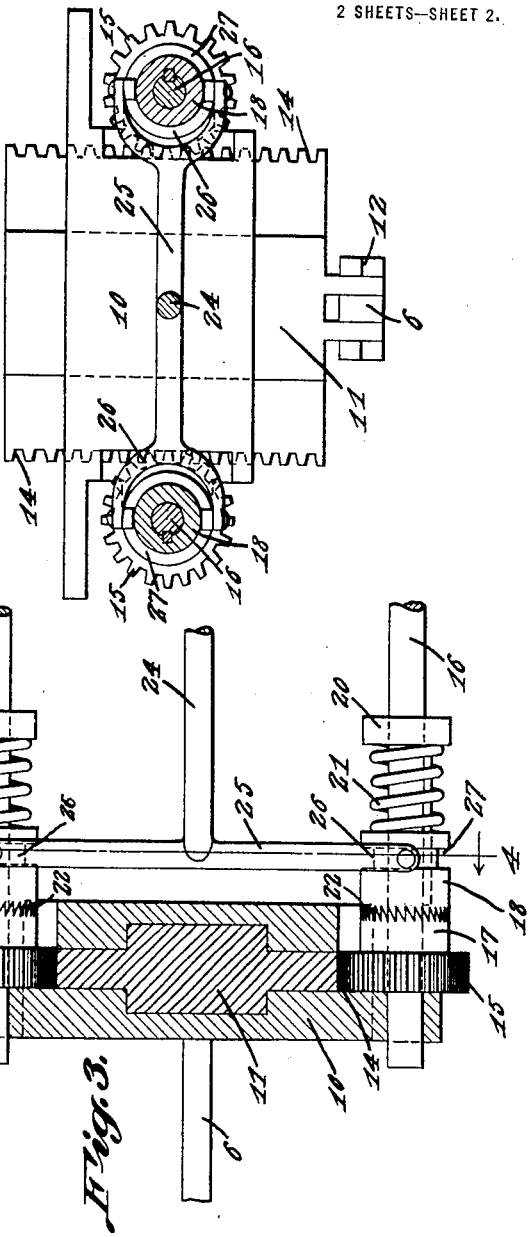

WILLIAM F. PILLMORE, OF WESTERNVILLE, NEW YORK.

ATTACHMENT FOR AUTOMOBILES.

1,397,879.  Specification of Letters Patent.  Patented Nov. 22, 1921.

Application filed April 6, 1921. Serial No. 459,126.

*To all whom it may concern:*

Be it known that I, WILLIAM F. PILLMORE, a citizen of the United States, residing at Westernville, in the county of Oneida and State of New York, have invented a new and useful Attachment for Automobiles, of which the following is a specification.

It is the object of this invention to provide novel means whereby the vertical movement of the body of an automobile may be taken advantage of, for any desired purpose, such as to aid in propelling the vehicle, to run a generator or the like.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:—

Figure 1 shows in side elevation, an automobile whereunto the device forming the subject matter of this application has been applied, parts being broken away and parts appearing in section; Fig. 2 is a bottom plan showing a portion of an automobile embodying the invention; Fig. 3 is a section taken approximately on the line 3—3 of Fig. 1; Fig. 4 is a section taken approximately on the line 4—4 of Fig. 3.

The numeral 1 denotes the body of a motor propelled vehicle, the rear axle appearing at 2 and the body 1 being supported on the axle 2 by springs 3, in the usual way. The propelling engine for the vehicle is shown diagrammatically at 4 and is operatively connected with the rear wheels by any suitable mechanism indicated at 5.

In carrying out the invention, there is provided a lever 6 which extends longitudinally of the vehicle, the lever being fulcrumed intermediate its ends, as shown at 7 on the rear axle casing 2. The rear end of the lever 6 is pivoted at 8 to the lower end of a post 9 extended downwardly from the vehicle body 1.

A depending guide 10 is mounted on any accessible portion of the vehicle. In the guide 10, a slide 11 is mounted for reciprocation. The forward end of the lever 6 is pivoted at 12 to the lower end of the slide 11. On its opposite edges, the slide 11 is supplied with racks 14 meshing into pinions 15 loose on shafts 16 journaled in the guide 10 and in a bearing 23 on the vehicle. The pinions 15 have clutch members 17 coöperating with clutch members 18 splined as indicated at 19 to the shaft 16. The shafts 16 are supplied with abutments 20. Compression springs 21 surround the shafts 16, the forward ends of the springs 21 engaging the abutments 20 and the rear ends of the springs engaging the clutch members 18, so as to hold the clutch members 18 engaged normally with the clutch members 17 on the pinions 15. The clutch members 17 and 18 on each side of the vehicle are provided with interengaging ratchet teeth 22. The ratchet teeth 22 on the members 17 and 18 at one side of the vehicle face in a direction opposite to that in which the teeth on the members 17 and 18 at the other side of the vehicle face.

The numeral 24 denotes an operating member, in the form of a rod or bar, extended longitudinally of the vehicle. The operating member 24 is supplied at its rear end with a transverse head 25 having forks 26 engaged in circumferential grooves 27 formed on the clutch members 18, the construction last above alluded to being common and well known. A lever 28 is fulcrumed on the vehicle, and is located in convenient relation to a person occupying the front seat 50. The lever 28 is supplied with a latch mechanism 29, whereby the lever may be held in adjusted positions. The lower end of the lever 28 is pivoted at 51 to the forward end of the operating member 24.

On the forward ends of the shafts 16 are secured gear wheels 30 meshing into a pinion 31 on a shaft 32 journaled in the bearing 23 and in a bearing 33 carried by the vehicle. The gear wheel 34 is secured to the forward end of the shaft 32 and may, if desired, mesh into a pinion 35 on a shaft 36 constituting a part of a generator 37. Although the device is shown as used for operating the generator 37, it is to be understood that the power derived from the vertical movement of the vehicle body may be taken advantage of in any desired way. If preferred, the power thus derived may be used to aid in propelling the vehicle, the connection with the generator being illustrative, merely, of one of the many uses to which the power derived gratuitously from the vertical movement of the vehicle body may be put.

In practical operation when the body 1 of the vehicle moves upwardly and downwardly, a vertically swinging movement transmitted to the lever 6 by way of the post 9, it being noted that the lever is fulcrumed intermediate its ends, as shown at 7 on the rear axle casing 2. When the forward end of the lever 6 moves upwardly and downwardly, the slide 11 moves vertically in the depending guide 10. The racks 14 on the slide 11 transmit motion to the shafts 16 by way of the pinions 15 and the clutch members 17—18. Owing to the fact that the ratchet teeth 22 face in opposite direction, at the respective sides of the vehicle, motion will be transmitted to one of the shafts 16, when the slide 11 moves upwardly, motion being transmitted to the other shaft 16, when the slide moves downwardly. From the shafts 16, motion is transmitted by way of the gear wheels 30 and the pinion 31 to the shaft 32, and from the shaft 32, the power may be transmitted to any desired place of use. If desired, a generator 37 may be run from the shaft 32 by way of the gear wheel 34 of the shaft 32 and the pinion 35 on the shaft 36 of the generator. It is to be understood, however that the operator is under no compulsion to drive a generator. The power may be employed for any desired purpose.

When the operator desires to disconnect the mechanism, so that the vertical movement of the body of the vehicle no longer is used to transform energy, the lever 28 is tilted, whereupon the operating member 24 and its head 25, together with the parts 26 will draw the clutch members 18 forwardly, the springs 21 being compressed, and the clutch members 18 being withdrawn from operated engagement with the clutch members 17. Under such circumstances, the pinions 15 are left loose on the shafts 16 and no motion will be transmitted to the shafts 16.

Having thus described the invention, what is claimed is:—

1. In a device of the class described, a vehicle body mounted for vertical movement; a running gear; a lever fulcrumed on the running gear; means for connecting the lever with the body; a shaft supported for rotation; a pinion on the shaft; a rack meshing into the pinion; and means for connecting the pinion operatively with the lever.

2. In a device of the class described, a vehicle body mounted for vertical movement; a rack bar supported for sliding movement; means for connecting the rack bar with the body; shafts supported for rotation; pinions loose on the shafts and meshing with the rack bar; clutch mechanisms connecting the pinions with the shafts and embodying oppositely facing ratchet teeth; and means for operating the clutch mechanisms.

3. In a device of the class described, a vehicle body mounted for vertical movement; a running gear; a lever fulcrumed on the running gear; means for connecting the lever with the vehicle body; a guide on the vehicle body; a slide mounted to reciprocate in the guide and provided with a rack; means for connecting the slide with the lever; a shaft journaled for rotation in the guide; a pinion loose on the shaft and meshing into the rack bar; a clutch forming an operative connection between the pinion and the shaft; and means under the control of an operator for actuating the clutch.

In testimony that I claim the foregoing as my own, I have hereto affixed my signature in the presence of two witnesses.

WILLIAM F. PILLMORE.

Witnesses:
   F. F. Pillmore,
   Chas. Pillmore.